United States Patent [19]

Bogen

[11] Patent Number: 5,256,446

[45] Date of Patent: Oct. 26, 1993

[54] PROCESS FOR THE MANUFACTURE OF REFLECTORS, IN PARTICULAR REFLECTORS FOR AUTOMOTIVE VEHICLE HEADLAMPS

[75] Inventor: Hans-Werner Bogen, Dormagen, Fed. Rep. of Germany

[73] Assignee: BASF Lacke + Farber Aktiengesellschaft[DE/DE], Munster, Fed. Rep. of Germany

[21] Appl. No.: 761,805

[22] PCT Filed: Feb. 14, 1990

[86] PCT No.: PCT/EP90/00237

§ 371 Date: Sep. 12, 1991

§ 102(e) Date: Sep. 12, 1991

[87] PCT Pub. No.: WO90/10822

PCT Pub. Date: Sep. 20, 1990

[30] Foreign Application Priority Data

Mar. 13, 1989 [DE] Fed. Rep. of Germany ....... 3908119

[51] Int. Cl.$^5$ .................. B05D 5/06; B32B 15/08; B32B 15/20; C08J 3/28
[52] U.S. Cl. .................... 427/163; 522/121; 428/461; 428/483; 427/407.1
[58] Field of Search ............ 427/163, 44, 54.1, 407.1, 427/498, 512, 404; 522/121; 428/461, 483

[56] References Cited

U.S. PATENT DOCUMENTS

| | | | |
|---|---|---|---|
| 4,035,321 | 7/1977 | Shahidi et al. | 525/438 |
| 4,148,967 | 4/1979 | Satoh et al. | 427/412.1 |
| 4,198,465 | 4/1980 | Moore et al. | 427/54.1 |
| 4,590,101 | 5/1986 | Knapczyk | 427/386 |
| 4,647,506 | 3/1987 | Colon et al. | 427/44 |
| 4,649,062 | 3/1987 | Kosiorek et al. | 427/54.1 |
| 4,826,887 | 5/1989 | Kuyper et al. | 521/189 |
| 4,863,802 | 9/1989 | Moore et al. | 427/54.1 |
| 4,902,578 | 2/1990 | Kerr, III | 522/89 |
| 4,938,831 | 7/1990 | Wolf, Jr. | 156/107 |
| 5,026,771 | 6/1991 | Dupont et al. | 525/50 |
| 5,047,261 | 9/1991 | Moussa et al. | 427/54.1 |
| 5,053,554 | 10/1991 | Higbie et al. | 568/609 |
| 5,164,127 | 11/1992 | Boeckeler | 264/255 |

*Primary Examiner*—Shrive Beck
*Assistant Examiner*—Diana Dudash
*Attorney, Agent, or Firm*—Frank G. Werner; Anne Gerry Sabourin

[57] ABSTRACT

A process for the manufacture of reflectors, in particular reflectors for automotive vehicle headlamps, wherein a metallic film is applied to a metallization primer cured by UV or electron radiation. The radiation-curable metallization primer comprises A) 10 to 50% by weight of an acrylate copolymer containing ethylenically unsaturated side chains and having a number average molecular weight of 6,000 to 14,000, B) 4 to 50% by weight of a mixture of
  b1) 2 to 20% by weight of a monomer or oligomer containing three acryloyl groups,
  b2) 2 to 20% by weight of a polyethylenically unsaturated aliphatic oligomer of the formula (I)

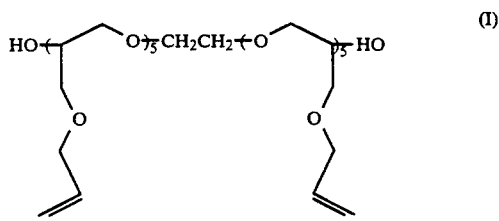

(I)

b3) 5 to 20% by weight of a difunctional acrylic carbonate monomer,
C) 1 to 8% by weight of a photoinitiator,
D) 0 to 5% by weight of customary auxiliaries and additives, and
E) 0 to 60% by weight of one or more solvents inert toward components A-D,
the components A to E in each case totalling 100% by weight.

18 Claims, No Drawings

PROCESS FOR THE MANUFACTURE OF REFLECTORS, IN PARTICULAR REFLECTORS FOR AUTOMOTIVE VEHICLE HEADLAMPS

The present invention relates to a process for the manufacture of reflectors, in particular reflectors for automotive vehicle headlamps, wherein 1 a radiation-curable coating composition is first applied to the reflector base and is cured by Uv or electron beams, and
2) a metallic film is applied to the paint film as reflective coating.

The present invention furthermore relates to the radiation-curable coating compositions used in the process and to the use thereof for coating smooth surfaces.

If reflectors are to reflect incident light as fully as possible and in the correct direction, the reflecting surface must have a high gloss and its shape must be very accurately designed. This requirement is true in particular for the parabolic reflectors of automotive vehicle headlamps. Automotive vehicle headlamps should on the one hand deliver high-intensity light despite the very limited available output and on the other hand their light, especially that of the dipped beam, must be directed as accurately as possible in order not to dazzle oncoming traffic.

The accuracy of the shape of the reflecting surface is determined in the known process for the manufacture of parabolic reflectors by the parabolic bases made mostly of metal or plastic. For this reason severe demands are made in the manufacture of those bases on the accuracy of their shape.

In the known process for achieving a high-gloss reflective coating, the reflector base is first coated with a paint film and to this paint film is then applied a metallic film by vacuum or electrolytic deposition (cf. for example DE-OS 1,772,120). However, very severe demands are made on the paint film in order that the applied metallic film acquires superior, optically flawless reflecting characteristics without, as far as possible, having to be polished.

An important task of the paint film is to provide a smooth surface for the subsequent metallization without costly grinding and polishing operations having to be performed on the paint film, i.e. the paint film must provide a well-levelled substrate. Important criteria for a suitable coating composition are therefore good flow-out and absence of stresses.

Furthermore, it is important to avoid the so-called irisization in the metallization process, for example by avoiding microfine gas emissions from the paint film. Adhesion is also extremely important. On the one hand the paint film must adhere well to the reflector base and on the other the metallic film must also adhere well to the paint film.

Finally, the coating composition must be readily applied by conventional application techniques (for example dipping, f low-coating, spraying) and they must be rapidly curable; the paint film must also be readily coated with metal in most cases by vapor metallization.

However, the use of radiation-curable coating compositions as priming coats for reflector bases creates considerable problems, especially as regards adhesion. The typically used reflector bases represent very smooth and partially non-homogeneous substrate surfaces consisting in general of various metals or thermosetting plastics, for example those based on low-profile (LP) polyester thermosets (i.e. polyester-thermoset moldings with a slight volume shrinkage incurred in hot press molding) or those based on fiber-reinforced plastic components derived from bulk-molding compounds (BMC). Reliable adhesion of the radiation-curable coating compositions on these surfaces can only be achieved by costly pretreatment of the surfaces (for example flame treatment, preliminary irradiation, corona discharge, introduction of an adhesion promoting layer) and/or aftertreatment of the coating (for example by heat).

It is true that JP-A 61/181871 discloses radiationcurable coating materials based on acrylate copolymers containing ethylenically unsaturated side chains which furnish coatings with improved adhesion, but this prior art does not come close to the invention, since it does not suggest using these known radiation-curable coating materials as primers in the manufacture of headlamp reflectors.

In an effort to improve adhesion, the crucial part of the invention disclosed in JP-A 61/181871 for synthesizing the acrylate copolymers lies in the use of 5 to 70% by weight of a (meth)acrylic ester of the formula where $R^1$ is H or $CH_3$, $R^2$ is an alkylene group of 2 to 6 carbon atoms, $R^3$ is an alkylene group of 5 to 7 carbon atoms and x and y are 1, 2 or 3.

Thus, the basic object of the present invention has been to provide a process for the manufacture of reflectors, in particular reflectors for automotive vehicle headlamps, which would furnish in as few or as simple steps as possible reflectors with good optical and technical characteristics. A particular feature should be good adhesion of the metallized film to the paint film and good adhesion of the paint film to the reflector base without any need for costly pretreatment of the reflector base or aftertreatment of the paint film. Furthermore, a well-levelled substrate should be achievable by the paint film in order to avoid costly grinding and polishing operations. At the same time the coating compositions used should be rapidly curable by radiation, have a good flow-out and be free from stresses, and the resultant coatings should in addition to the characteristics defined above be readily metallizable and have good weathering resistance.

Surprisingly, the object is achieved by a process for the manufacture of reflectors, in particular reflectors for automotive vehicle headlamps, wherein
1) a radiation-curable coating composition is first applied to the reflector base and is cured by UV or electron beams, and
2) a metallic film is applied to the paint film as reflective coating.

In this process the radiation-curable coating composition comprises
A) 10 to 50% by weight of an acrylate copolymer A containing ethylenically unsaturated side chains and having a number average molecular weight of 6,000 to 14,000,
B) 4 to 50% by weight of other ethylenically unsaturated monomeric and/or oligomeric compounds consisting of a mixture of
   b1) 2 to 20% by weight of a monomer or oligomer containing three acryloyl groups,
   b2) 2 to 20% by weight of a polyethylenically unsaturated aliphatic oligomer of the formula (I)

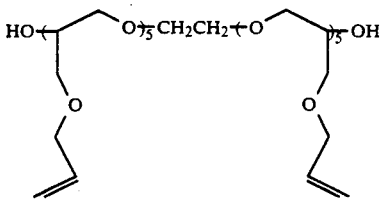

b3) 5 to 20% by weight of a difunctional acrylic carbonate monomer

C) 1 to 8% by weight of a photoinitiator,

D) 0 to 5% by weight of customary auxiliaries and additives,

E) 0 to 60% by weight of one or more solvents inert toward the components used, the components A to E in each case totalling 100% by weight.

The present invention furthermore relates to the radiation-curable coating compositions employed in the process according to the invention, to the use of these radiation-curable coating compositions for coating smooth surfaces and to the substrates coated by these coating compositions.

Given the large number of known radiation-curable coating compositions, it was surprising and could not be foreseen that it was precisely by the use of radiation-curable coating compositions based on A) acrylate copolymers containing ethylenically unsaturated side chains and having an average molecular weight of 6,000 to 14,000 and B) a mixture of a monomer or oligomer containing three acryloyl groups, an oligomer of the formula (I) and a difunctional acrylic carbonate monomer in the process according to the invention that the paint film on the reflector base and the metallic film on the paint film should exhibit such outstanding adhesion without any need for costly pretreatment and aftertreatment operations.

It is furthermore surprising that the coating compositions used in the process according to the invention can be rapidly cured without losing their excellent adhesion characteristics, since normally high curing rates cause increased shrinkage and hence loss of adhesion.

Finally, the radiation-curable coating compositions are distinguished by good f low-out and absence of stresses as well as by being readily applied by dipping, f low-coating and spraying. In addition, the resultant coatings are readily metallizable and have good weathering resistance.

It is true that U.S. Pat. No. 4,035,321 and EP-A-271,047 also disclose radiation-curable coating compositions based on acrylate copolymers containing unsaturated side chains and on other ethylenically unsaturated monomers, but neither of these publications contain references either to the use of these coating compositions in a process for the manufacture of reflectors or to any modifications of these coating compositions in order that they acquire the profile of characteristics outlined above.

In the text which follows, the radiation-curable coating composition employed in the process according to the invention is first described in greater detail.

Alkyl acrylates or a mixture of at least one alkyl acrylate and at least one alkyl methacrylate are suitable as the component a1 in the preparation of the acrylate copolymer A. Examples of suitable compounds are methyl acrylate, ethyl acrylate, propyl acrylate, butyl acrylate, isopropyl acrylate, isobutyl acrylate, pentyl acrylate, isoamyl acrylate, hexyl acrylate, cyclohexyl acrylate as well as the corresponding methacrylates. The amount of the component a1 is 70 to 96% by weight.

A mixture of 30 to 70% by weight, preferably 50% by weight, of an alkyl acrylate and 70 to 30% by weight, preferably 50% by weight, of an alkyl methacrylate, in each case based on the total weight of the component a1, is preferably used. A corresponding mixture of methyl methacrylate and ethyl acrylate is very particularly preferred.

Ethylenically unsaturated monomers containing at least one epoxide, hydroxyl or carboxyl group are suitable as the component a2.

Examples of monomers containing at least one epoxide group are glycidyl acrylate, glycidyl methacrylate, allyl glycidyl ether, glycidyl crotonate, glycidyl α-ethylacrylate and crotonyl glycidyl ether, glycidyl methacrylate being preferred.

Examples of monomers containing at least one hydroxyl group are hydroxyalkyl acrylates and hydroxyalkyl methacrylates as well as the hydroxyalkyl esters of other ethylenically unsaturated carboxylic acids, for example hydroxyethyl acrylate, hydroxypropyl acrylate, hydroxybutyl acrylate, hydroxyamyl acrylate, hydroxyhexyl acrylate and hydroxyoctyl acrylate, the corresponding methacrylates as well as the corresponding hydroxyalkyl esters of crotonic, isocrotonic, vinylacetic, itaconic, maleic and fumaric acid. The corresponding hydroxyalkyl acrylates and hydroxyalkyl methacrylates are preferred.

Hydroxyethyl acrylate is very particularly preferred. Examples of other compounds suitable as the component a2 are ethylenically unsaturated carboxylic acids such as acrylic acid, methacrylic acid, maleic acid, fumaric acid, crotonic acid, isocrotonic acid, vinylacetic acid and itaconic acid. Acrylic acid is preferred.

The component a2 is used in an amount of 2 to 10% by weight.

The synthesis of the copolymer (1) from the components a1 and a2 is preferably carried out by the well known methods of solution polymerization in a solvent which is inert toward the components a1, a2 and a5, in the presence of 0.2 to 4% by weight of a polymerization initiator a3 at temperatures between 100 and 160° C. in the course of a reaction time which is generally between 2 and 10 hours.

Examples of suitable radical initiators a3 are organic peroxides such as dibenzoyl peroxide, dicumyl peroxide, cumyl hydroperoxide, di-tert.-butyl peroxide, tert.-butyl hydroperoxide, 2,2-di-tert.-butyl peroxybutane, tert.butyl perbenzoate, 1,3-bis(tert.-butylperoxyisopropyl)benzene, diisopropylbenzenemonohydroperoxide, anddiacyl peroxides such as diacetyl peroxide, peroxy ketals such as 2,2-di(tert.-amylperoxy)propane and ethyl 3,3-di(tert.-amylperoxy)butyrate, thermolabile highly-substituted ethane derivatives, for example those based on benzopinacol and based on silyl-substituted ethane derivatives. Furthermore,, aliphatic azo compounds, for example azobiscyclohexanenitrile, may also be employed.

Examples of suitable solvents are aromatic hydrocarbons such as toluene and xylene; higher substituted aromatic hydrocarbons such as Solventnaphtha ®, heavy benzene, various Solvesso ® solvents, various Shellsol ® solvents and Deasol ® as well as aliphatic and cycloaliphatic hydrocarbons such as various petroleum ethers, mineral terpentine oil, tetralin and decalin; esters such as n-butyl acetate, isobutyl acetate, hexyl acetate, n-butylbutyrate, isobutylisobutyrate, methyl glycol acetate, ethyl glycol acetate, butyl glycol acetate, ethylene glycol diacetate, ethyl diglycol acetate; ethers such as diglycol dimethyl ether, dibutyl ether, di-sec.-butyl ether, ethylene glycol monobutyl ether and dioxane as well as ketones such as methyl ethyl ketone, methyl butyl ketone, ethyl butyl ketone, diisopropyl ketone and cyclohexanone.

The solution polymerization of the components a1 and a2 is preferably carried out in such a manner that a portion of the solvent is initially taken and heated to the polymerization temperature in question. The monomers and the polymerization initiator dissolved in a further portion of the solvent are added, preferably separately. The addition of the initiator preferably lasts about 1 to 2 hours longer than the addition of the monomers in order also to achieve an effective action during the postpolymerization phase. It is also possible to add the polymerization initiator together with the monomers or, in case initiators with a low rate of decomposition under the prevailing reaction conditions are used, to add the initiator initially together with the solvent and gradually add only the monomers.

The reaction mixture is preferably kept at the polymerization temperature until the copolymerization reaction is completed. Subsequently the component a5, as such or diluted with further solvent, is added, preferably together with the polymerization inhibitor a4, at temperatures between 80° and 140° C. However, the inhibitor may be added directly to the reaction mixture and the component a5 added alone. The reaction mixture is then kept for the second reaction at temperatures between 60 and 100° C. until the reaction of the X groups of the component a2 with the Y groups of the component a5 has been completed.

The polymerization inhibitor a4 is used in amounts of 0.05 to 0.5% by weight. Examples are the commonly used compounds, such as quinones and phenols, for example hydroquinone, p-tert.-butylcatechol, p-methoxyphenol, 2,4-dichloro-6-nitrophenol, n-propyl gallate, di-tert.butyl-p-cresol, 2,2'-methylene-bis(4-methyl-6-tert.butylphenol), 1-amino-7-naphthol, p-benzoquinone, 2,6-dichloro-p-benzoquinone, 2-amino-1,4-naphthoquinone, 3-aminoanthraquinone, diphenylamine, α- and β-naphthylamine, p-nitrosodimethylaniline, phenothiazine, Nnitrosodimethylamine, hexamethylphosphoramide, n-dodecylmercaptan, benzenethiol, phenylhydrazine, divinylacetylene, as well as various salts of antimony and copper. Component A5 is an ethylenically unsaturated monomer containing at least one reactive group Y. If X is component A2 is a carboxyl group, than Y is a hydroxyl or epoxide group. If X in component a2 is a hydroxyl or epoxide group, then Y is a carboxyl group.

Examples of suitable ethylenically unsaturated monomers a5 containing at least one OH, COOH or epoxide group are the hydroxyalkyl acrylates and hydroxyalkyl methacrylates already listed in the description of the component a2, the hydroxyalkyl esters of other ethylenically unsaturated monocarboxylic and dicarboxylic acids, the ethylenically unsaturated monocarboxylic and dicarboxylic acids listed therein as well as the unsaturated epoxides there described. The corresponding derivatives of acrylic and methacrylic acids are preferably used, glycidyl methacrylate, hydroxyethyl acrylate and acrylic acid being very particularly preferred.

The amount of the component a5 used is about 2 to 15% by weight. The amount of the component a5 is preferably chosen such that the equivalent ratio of the X groups of the copolymer (1) to the Y groups of the component a5 is 1:1, i.e. the component a5 is added in a stoichiometric amount in respect of the component a2.

The water of reaction which may separate in the addition reaction of the group X and the group Y is removed continuously from the reaction mixture. The addition reaction is preferably carried out in the presence of up to 0.5% by weight of a suitable catalyst, for example the usual esterification catalysts.

The acrylate copolymer A prepared by the two-stage process described above has a number average molecular weight between 6,000 and 14,000, preferably between 8,000 and 10,000, and a double bond content of 0.5 to 1.5 equivalents/1,000 g of copolymer A.

A radiation-curable coating composition is then prepared by well known methods (cf. for example U.S. Pat. No. 4,035,321) using this acrylate copolymer A.

This radiation-curable coating composition comprises, besides 10 to 50% by weight, preferably 15 to 35% by weight, of the acrylate copolymer A and 4 to 50% by weight, preferably 15 to 35% by weight, of a mixture B of various unsaturated compounds.

The coating composition comprises as the first component b1 of the mixture B 2 to 20% by weight, preferably 8 to 12% by weight, of a monomer or oligomer containing 3 acryloyl groups.

Examples of suitable compounds are glycerol triacrylate, pentaerythritol triacrylate, trimethylolpropane triacrylate, trimethylolethane triacrylate and triacrylate oligomers having a molecular weight (number average) below 800, for example triacrylates based on reaction products of acrylic acid with diols and triols or based on the reaction products of acrylic acid with low-molecular polyesters containing hydroxyl groups. Propoxylated glycerol esterified with acrylic acid, having an average molecular weight of 480, is preferably used.

These triacrylate monomers and oligomers are known and are available on the market in the form of various commercial products. The commercial products distributed by UCB, Drogenbos, Belgium, under the trade name "OTA 480" is preferably used.

The radiation-curable coating composition according to the invention further comprises as the component b2 2 to 20% by weight, preferably 8 to 12% by weight, of a polyethylenically unsaturated aliphatic oligomer of the formula (I):

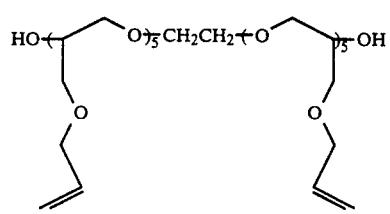

This compound is known and is distributed, for example, by Monsanto under the trade name "SANTOLINK XI 100".

Defunctional acrylic carbonate monomers are employed as the component b3 in an amount of 5 to 20% by weight, preferably 6 to 10% by weight. The preferred difunctional acrylic carbonate monomer has the following formula:

$$\begin{array}{c} COO-CH_2-CH_2-O-COO-CH_2-CH_2-O-CH_2-CH_2-O-COO-CH_2-CH_2-OOC \\ | \hspace{9cm} | \\ CH \hspace{9cm} CH \\ \| \hspace{9cm} \| \\ CH_2 \hspace{9cm} CH_2 \end{array}$$

This compound is known and is distributed, for example, by SNPE under the trade name "Acticryl CL 993".

Suitable photoinitiators (component C) for the radiationcurable coating compositions are the customary photoinitiators and photoinitiator systems known per se, for example benzoin, benzoin ether, substituted benzoins, alkyl ethers of substituted benzoins such as α-methylbenzoin alkyl ether or α-hydroxymethylbenzoin alkyl ether; benzils, benzil ketals, for example benzil dimethyl ketal, benzil methyl ethyl ketal, benzil methyl benzyl ketal; initiators based on ketones, for example benzophenone and its derivatives such as 4,4'-dimethylaminobenzophenone, 4,4'-diethylaminobenzophenone, acetophenone, diethoxyacetophenone, m-chloroacetophenone, propiophenone, hydroxycyclohexyl phenyl ketone, 2-hydroxy-2-methyl-l-phenylpropan-l-one; anthraquinone and its derivatives as well as thioxanthone and its derivatives as well as mixtures of various initiators. A combination of benzophenone and 2-hydroxy-2-methyl-1-phenylpropan-1-one in the ratio 4:1 to 2:1 or a combination of benzophenone and hydroxycyclohexyl phenyl ketone in the ratio 3-.1 to 5:2 or as the sole initiator diethoxyacetophenone are preferably used. The photoinitiator (component C) is usually employed in an amount of 1 to 8% by weight, based on the coating composition.

The radiation-curable coating compositions may further comprise, if appropriate, customary auxiliaries and additives (component D) in amounts of 0 to 5% by weight, based on the coating compositions. Examples of these are synergistically acting compounds, such as tertiary amines, flow control agents and plasticizers.

To increase the rate of curing, driers may also be added to the coating compositions in amounts of 0.02 to 1% by weight, based on the coating composition. Examples of suitable driers are metal salts of (cyclo)aliphatic, naturally occurring or synthetic acids, for example linoleic acid, naphthenic acid or 2-ethylhexanoic acid, suitable metals being cobalt, manganese, lead, zirconium, calcium and zinc. Mixtures of various driers may of course also be employed. To improve water resistance, 0.5 to 2.0% by weight, based on the coating composition, of an organosilane containing aminofunctions, for example N-β-aminoethylaminopropyltrimethoxysilane or triamino-modified propyltrimethoxysilane (for example the adhesion promoting agent DYNASYLAN®, type "TRIAMO", commercial product of Dynamit-Nobel Chemie) may be added, if desired. These silanes containing aminofunctions exercise at the same time a synergistic function. In addition, 0.5 to 2.0% by weight, based on the coating composition, of a silane containing glycidyl functions, for example γ-glycidyloxypropyltrimethoxysilane may be added to improve water resistance.

For the purpose of adjusting viscosity to suit the application method in question and to dissolve the acrylate copolymer A, the radiation-curable coating compositions used according to the invention may also comprise 0 to 60% by weight, preferably 25 to 50% by weight, of one or more solvents inert toward the components employed. Examples of suitable solvents are the solvents already listed under the preparation of the acrylate copolymer A above.

The radiation-curable coating compositions may be applied to the previously cleaned and especially degreased surface by spraying, rolling, flow-coating, dipping, blade-coating or brushing. In the further processing of the coated substrates to reflectors, for example to headlamp reflectors, the application is preferably carried out by dipping, flow-coating or spraying, if appropriate in combination with a centrifuging operation.

The reflector bases to be coated by the process according to the invention are generally made of metal (for example steel or similar materials) or of thermosetting plastics based on low-profile (LP) polyester thermosets, i.e. polyester-thermoset moldings with a slight volume shrinkage incurred in hot press molding or fiber-reinforced plastic components derived from bulk-molding compounds (BMC).

The radiation-curable coating compositions according to the invention are not only highly suited for the manufacture of reflectors, as already repeatedly pointed out, but also for coating of smooth surfaces, for example glass, metals such as steel, aluminum, black plate, tin plate, and a variety of plastics (for example LPP and BMC plastics, see above). In addition, the coating compositions according to the invention are highly suited to provide protective coatings of already metallized reflectors.

When used as primer for metallization or as protective layer of a metallized film, the dry film thickness of the coating composition is generally between 5 and 40 μm. The film thickness in question depends on a variety of factors, for example on the substrate, the method of application and on the conditions of curing.

The curing of the paint films is carried out by radiation, preferably by UV radiation. The equipment and conditions for these curing methods are known (cf. for example Dr. ReHolman, Dr. P. Oldring, "UV and EB-Curing, Formulations for Printing Inks, Coatings and Paints", Sitan - Technology, London 1988) and require no further description.

For the production of the reflective coating, in the second stage of the process according to the invention a metallic film is applied to the paint film. This is preferably performed by vacuum deposition of the metal film. There are no fundamental difficulties linked to the evaporation of any metal and its deposition on the paint film of the reflector. However, the metal should be preferably chosen according to the application.

For the production of the reflective coating on automotive headlamp reflectors and the like, the use of aluminum is recommended. Aluminum mirrors possess a high reflectivity over the entire range of visible light. Moreover, reflective coatings of aluminum are highly resistant to tarnishing and chemical corrosion.

Excellent, long-lasting reflectors may be also obtained using reflective coatings of silver which are provided with a protective coating consisting of evaporated quartz.

The examples below further elucidate the invention.

All parts and percentages are parts and percentages by weight, unless expressly stated otherwise.

Preparation of an acrylate copolymer A containing ethylenically unsaturated side chains A temperature-controllable reaction vessel fitted with a stirrer, reflux condenser, thermometer and inlet feeds is charged with 38.2 parts of n-butyl acetate and heated to 120° C. A mixture of 20.1 parts of methyl methacrylate, 19.6 parts of ethyl acrylate, 3.1 parts of acrylic acid and 0.8 parts of t-butyl perbenzoate is added dropwise in the course of 4 hours with the temperature being kept constant at 120° C. The post-polymerization reaction is then allowed to proceed for 5 hours at 120° C. A mixture of 12.6 parts of n-butyl acetate, 5.5 parts of glycidyl methacrylate and 0.1 part of hydroquinone is then added dropwise in the course of 2 hours at 110° C. The reaction mixture is stirred further for 3 to 4 hours at 80° C. and then cooled.

The acrylate copolymer A obtained in this manner has a number average molecular weight of 8949 (determined by GPC and calculated with the aid of a calibration curve constructed using polystyrene standard) and a double bond content of 1.0 equivalents/1,000 g of copolymer.

EXAMPLE 1

A radiation-curable coating composition is prepared by known methods (cf. for example Dr. R. Holman, Dr. P. Oldring, IIUV and EB-Curing, Formulations for Printing Inks, Coatings and Paints, Sitan-Technology, London 1988) from the following components:
23.0 parts of acrylate copolymer solution
7.5 parts of difunctional acrylic carbonate monomer of the formula

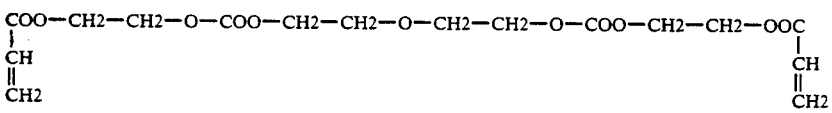

("Acticryl L 993", commercial product from SNPE)
0.2 parts of an additive customarily used in radiation-curable paints, based on a dimethylpolysiloxane polyester cocondensate
4.0 parts of benzophenone
1.0 part of 2-hydroxy-2-methyl-1-phenylpropan-1-one
9.0 parts of a commercial oligomer containing 3 acryloyl groups, molecular weight 480 (commercial product "OTA 480" from UBC, Drogenbos, Belgium)
9.0 parts of a polyethylenically unsaturated aliphatic oligomer of the formula

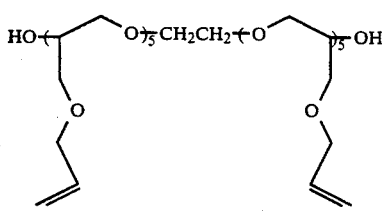

46.3 parts of n-butylacetate

This coating composition is sprayed onto a cleaned and degreased steel panel (dry film thickness 25 μm).

The curing of the coating composition takes place in a UV irradiation installation, equipped with two mercury medium-pressure light sources, each consisting of a lamp with an output of 80 W/cm, at a conveyor speed of 10 m/min, in 4 passes. The radiation dose is 0.8 J/CM² (measured using the dosimeter UVICURE, system EIT, from Eltosch).

Immediately afterwards adhesion is tested by the crosshatch method of DIN 53151. The result is given in Table 1. In addition, adhesion is also determined by the socalled Tesafilm ® pull-off method. In this test a strip of Tesafilm ® is pressed onto the paint film and then pulled off. The area of the paint film removed by the strip in this manner is determined and the result noted (0=100%, 1=90%, ... and 5=<20% of undamaged paint surface).

The result of this test is also listed in Table 1.

The resultant coating is furthermore distinguished by a well-levelled substrate. No irisization occurs in the subsequent metallization, since, for example, there are no microfine gas emissions from the paint film. A further result is the excellent adhesion of the metal film to the paint film. Even coating of the metal film with this radiation-curable coating composition is possible, resulting in equally good paint adhesion.

EXAMPLE 2

The radiation-curable coating composition described in Example 1 is applied by the dipping method to a cleaned and especially thoroughly degreased glass plate (dry film thickness 25 μm).

As in Example 1, the coating composition is cured by a UV beam (dose rate 0.8 J/CM²). As in Example 1, immediately afterwards the adhesion is tested by the DIN 53151 crosshatch test and by the Tesafilm ® pull-off method. The results are given in Table 1.

EXAMPLE 3

The radiation curable coating composition described in Example 1 is sprayed onto a cleaned (and especially degreased) LPP thermosetting plastic surface (dry film thickness 25 μm).

As in Example 1, the coating composition is cured by a UV beam (dose rate 0.8 J/CM²) and immediately afterwards the adhesion is determined by the crosshatch method and by the Tesafilm ® pull-off method. The results are given in Table 1.

TABLE 1

| | Test results | |
|---|---|---|
| Example | Crosshatch test | Tesafilm ® test |
| 1 | 0–1 | 1 |
| 2 | 0–1 | 1 |
| 3 | 0 | 0 |

I claim:
1. A radiation-curable coating composition which comprises
(A) 10 to 50% by weight of an acrylate copolymer containing ethylenically unsaturated side chains, and having a number average molecular weight of 6,000 to 14,000,
(B) 9 to 50% by weight of compounds selected from the group consisting of ethylenically unsaturated monomeric and oligomeric compounds and mixtures thereof, said compounds comprising b1) 2 to 20% by weight of a compound selected from the group consisting of monomers and oligomers containing three acryloyl groups, b2) 2 to 20% by weight of a polyethylenically unsaturated aliphatic oligomer of the formula (I),

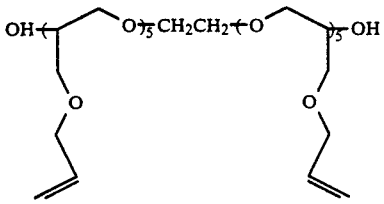

b3) 5 to 20% by weight of a difunctional acrylic carbonate monomer, wherein the percent by weight of the components b1-b3 are based on the total weight of the coating composition, (C) 1 to 8% by weight of a photoinitiator, (D) 0 to 5% by weight of additives selected from the group consisting of tertiary amines, flow control agents, plasticizers, driers and organosilane, and (E) 0 to 60% by weight of one or more solvents inert toward components A-D components A-E totaling 100% by weight.

2. The coating composition as claimed in claim 1, wherein the coating composition comprises:

A) 15 to 35% by weight of the acrylate copolymer;

B) 22 to 35% by weight of the ethylenically unsaturated compounds comprising the mixture of b1) 8 to 12% by weight of a compound selected from the group consisting of a monomer and oligomer containing three acryloyl groups;

b2) 8 to 12% by weight of a polyethylenically unsaturated aliphatic oligomer of the formula (I): and b3) 6 to 10% by weight of a difunctional acrylic carbonate monomer, C) 1 to 8% of the photoinitiator;

D) 0 to 5% of the additives selected from the group consisting of tertiary amines, flow control agents, plasticizers, driers and organosilanes;

E) 25 to 50% by weight of the solvent;

the components A to E in each case totalling 100% by weight; and wherein the percent by weight of the components b1, b2 and b3 are based on the total weight of the coating composition.

3. The coating composition as claimed in claim 1, wherein a propoxylated glycerol esterified with acrylic acid and having an average molecular weight of 480 is used as the component b1.

4. The coating composition as claimed in claim 1, wherein a difunctional acrylic carbonate monomer of the formula

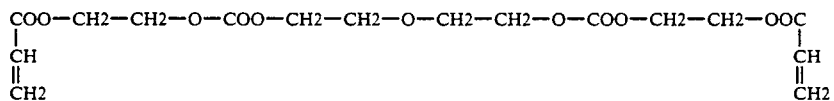

is used as the component b3.

5. The coating composition as claimed in claim 1, wherein the acrylate copolymer is prepared by I) polymerizing in an inert solvent a1) 70 to 96% by weight of at least one compound selected from the group consisting of alkylacrylates and a mixture of alkyl acrylates and methacrylates; and a2) 2 to 10% by weight of an ethylenically unsaturated monomer containing at least one reactive group X, where X is a carboxyl, hydroxyl or epoxide group, in the presence of a3) 0.2 to 4% by weight of a polymerization initiator and II) combining the copolymer formed by the reaction of a1-a3 with a4) 0.05 to 0.5% by weight of a polymerization inhibitor; and a5) 2 to 15% by weight of an ethylenically unsaturated monomer containing at least one reactive group Y where Y is a hydroxyl or epoxide group, if X is a carboxyl group, Y is a carboxyl group, if X is a hydroxyl or epoxide group, the components a1 to a5 in each case totaling 100% by weight.

6. The coating composition as claimed in claim 5, wherein a mixture of 30 to 70% by weight of alkyl acrylates and 70 to 30% by weight of alkyl methacrylates, based on the weight of the component a1, is used as the component a1.

7. The coating composition as claimed in claim 5, wherein components a2 and/or a 5 are selected from the group consisting of derivatives of acrylic acid, methacrylic acid and mixtures thereof.

8. A process for the manufacture of reflectors, comprising the following steps:

1) a radiation-curable coating composition is first applied to a reflector base and is cured by UV or electron beams; and 2) a metallic film is applied to the radiation-cured coating as reflective coating, in which the radiation-curable coating composition comprises:

A) 10 to 50% by weight of an acrylate copolymer containing ethylenically unsaturated side chains and having a number average molecular weight of 6,000 to 14,000;

(B) 9 to 50% by weight of other compounds selected from the group consisting of ethylenically unsaturated monomeric and oligomeric compounds and mixtures thereof, comprising a mixture of b1) 2 to 20% by weight of a compound selected from the group consisting of monomers and oligomers containing three acryloyl groups;

b2) 2 to 20% by weight of a polyethylenically unsaturated aliphatic oligomer of the formula (I),

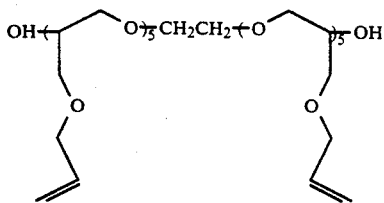

b3) 5 to 20% by weight of a difunctional acrylic carbonate monomer;
(C) 1 to 8% by weight of a photoinitiator;
(D) 0 to 5% by weight of additives selected from the group consisting of tertiary amines, flow control agents, plasticizers, driers and organosilanes; and
(E) 0 to 60% by weight of at lest one solvent inert toward components A-D, the components A to E in each case totaling 100% by weight; and wherein the percent by weight of the components b1, b2, and b3 are based on the total weight of the coating composition.

9. The process as claimed in claim 8, wherein a protective paint is applied to the metallic film.

10. The process as claimed in claim 9, wherein the protective paint applied to the metallic film comprises:
A) 10 to 50% by weight of the acrylate copolymer containing ethylenically unsaturated side chains and having a number average molecular weight of 6,000 to 14,000;
(B) 9 to 50% by weight of the other compounds selected from the group consisting of the ethylenically unsaturated monomeric and oligomeric compounds and mixtures thereof, comprising the mixture of b1) 2 to 20% by weight of a compound selected from the group consisting of monomer sand oligomers containing three acryloyl groups;
b2) 2 to 20% by weight of a polyethylenically unsaturated aliphatic oligomer of the formula (I),

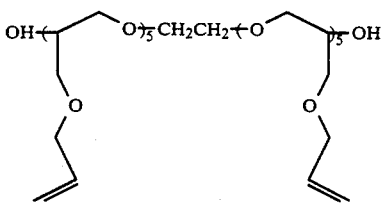

b3) 5 to 20% by weight of a difunctional acrylic carbonate monomer;
(C) 1 to 8% by weight of the photoinitiator;
(D) 0 to 5% by weight of the additives selected from the group consisting of tertiary amines, flow control agents, plasticizers, driers and organosilane; and
(E) 0 to 60% by weight the of at least one solvent inert toward components A-D, the components A to E in each case totaling 100% by weight; and wherein the percent by weight of the components b1, b2, and b3 are based on the total weight of the coating composition and wherein this coating composition is cured by UV or electron radiation.

11. The process as claimed in claim 8, wherein the coating composition comprises:
A) 15 to 35% by weight of the acrylate copolymer
B) 22 to 35% by weight of the ethylenically unsaturated compounds comprising the mixture of
b1) 8 to 12% by weight of a compound selected from the group consisting of monomers and oligomers containing three acryloyl groups;
b2) 8 to 12% by weight of a polyethylenically unsaturated aliphatic oligomer of the formula (I), and
b3) 6 to 10% by weight of a difunctional acrylic carbonate monomer;
(C) 1 to 8% by weight of the photoinitiator;
(D) 0 to 5% by weight of the additives selected from the group consisting of tertiary amines, flow control agents, plasticizers, driers and organosilane; and
(E) 25 to 50% by weight of the solvent the components A to E in each case totaling 100% by weight; and wherein the percent by weight of the components b1, b2 and b3 are based on the total weight of the coating composition.

12. The process as claimed in claim 8, wherein a propoxylated glycerol esterified with acrylic acid and having an average molecular weight of 480 is used as the component b1.

13. The process as claimed in claim 8, wherein a difunctional acrylic carbonate monomer of the formula

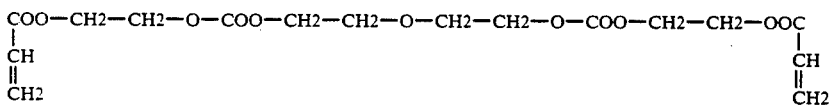

is used as the component b3.

14. The process as claimed in claim 3, wherein the acrylate copolymer is prepared by: polymerizing in an inert patient
a1) 70 to 96% by weight of at least one compound selected from the group consisting of an alkylacrylates and a mixture of an alkyl acrylate and methacrylate; and
a2) 2 to 10% by weight of an ethylenically unsaturated monomer containing at lest one reactive group X, wherein X is a carboxyl, hydroxyl or epoxide group, and wherein the acrylate copolymer is reacted with 2 to 15% by weight of an ethylenically unsaturated monomer containing at least one reactive group Y to form ethylenically unsaturated sidechains where Y is a hydroxyl or epoxide group, if X is a carboxyl group, Y is a carboxyl group, if X is a hydroxyl or epoxide group, in the presence of
a3) 0.2 to 4% by weight of a polymerization initiator and
II) combining the copolymer formed by the reaction of a1-a3 with
a4) 0.05 to 0.5% by weight of a polymerization inhibitor; and a5) 2 to 15% by weight of an ethylenically unsaturated monomer containing at least one reactive group Y where Y is a hydroxyl or epoxide group, if X is a carboxyl group, Y is a carboxyl group, if X is a hydroxyl or epoxide group, the components a1 to a5 in each case totaling 100% by weight.

15. The process as claimed in claim 14, wherein a mixture of 30 to 70% by weight of alkyl acrylates and 70 to 30% by weight of alkyl methacrylates, based on the weight of the component a1, is used as the component a 1.

16. The process as claimed in claim 14, wherein components A2 and/or A5 are selected from the group consisting of derivatives of acrylic acid.

17. A substrate coated with the radiation-curable coating composition as claimed in claim 1.

18. A radiation-curable coating composition which comprises
   (A) 10 to 50% by weight of an acrylate copolymer which is the polymerization product of
      a1) 70 to 96% by weight of at least one compound selected from the group consisting of an alkylacrylates and a mixture of an alkyl acrylate and methacrylate; and
      a2) 2 to 10% by weight of an ethylenically unsaturated monomer containing at least one reactive group X, where X is a carboxyl, hydroxyl or epoxide group;
      and wherein the copolymer is reacted with 2 to 15% by weight of an ethylenically unsaturated monomer containing at least one reactive group Y to form ethylenically unsaturated sidechains where Y is a hydroxyl or epoxide group, if X is a carboxyl group, Y is a carboxyl group, if X is a hydroxyl or epoxide group, wherein the copolymer has a number average molecular weight of 6,000 to 14,000;
   (B) 9 to 50% by weight of compounds selected from the group consisting of ethylenically unsaturated monomeric and oligomeric compounds and mixtures thereof, comprising
      b1) 2 to 20% by weight of a compound selected from the group consisting of monomers and oligomers containing three acryloyl groups,
      b2) 2 to 20% by weight of a polyethylenically unsaturated aliphatic oligomer of the formula (I),

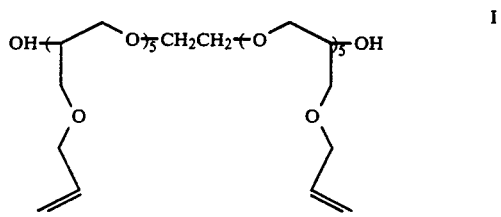

b3) 5 to 20% by weight of a difunctional acrylic carbonate monomer, wherein the percent by weight of the components 1-3 are based on the total weight of the coating composition,
   (C) 1 to 8% by weight of a photoinitiator,
   (D) 0 to 5% by weight of additives selected from the group consisting of tertiary amines, flow control agents, plasticizers, driers and organosilanes, and
   (E) 0 to 60% by weight of one or more solvents inert toward components A-D, the components A-E totaling 100% by weight.

* * * * *